March 20, 1962 D. W. QUIRK 3,026,398
BASEBOARD ELECTRIC HEATING SYSTEM AND ELECTRIC
HEATING UNITS THEREFOR
Filed April 22, 1959 3 Sheets-Sheet 1
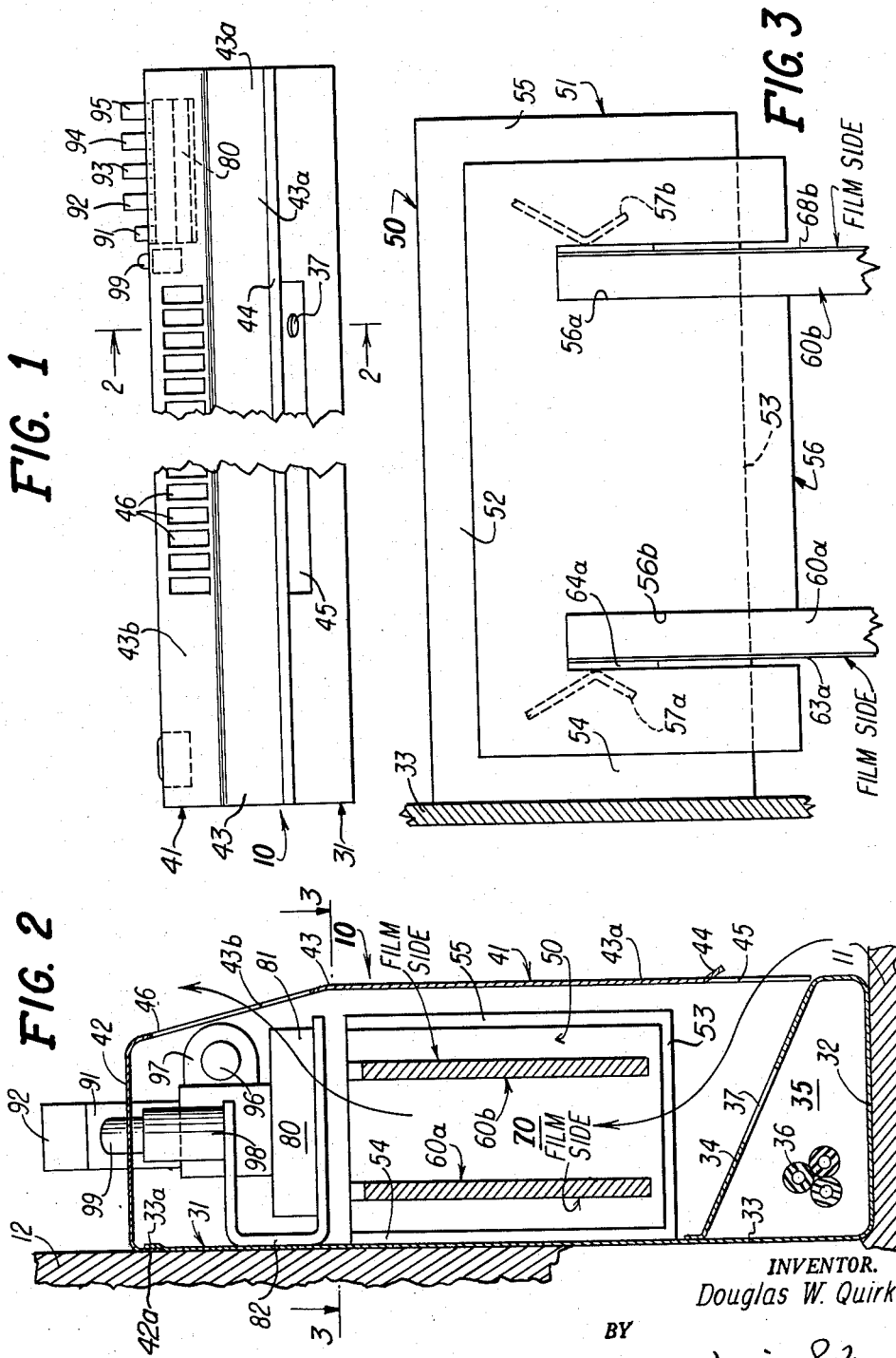
INVENTOR.
Douglas W. Quirk
BY
Prangley, Baird, Clayton, Miller & Vogel,
Attys.

March 20, 1962 D. W. QUIRK 3,026,398
BASEBOARD ELECTRIC HEATING SYSTEM AND ELECTRIC
HEATING UNITS THEREFOR
Filed April 22, 1959 3 Sheets-Sheet 2
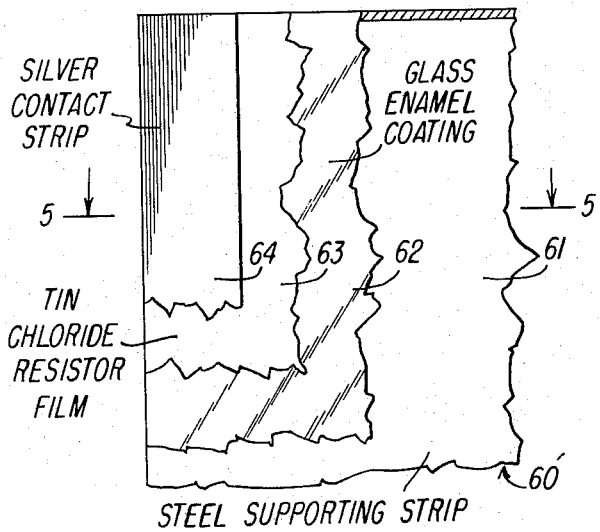
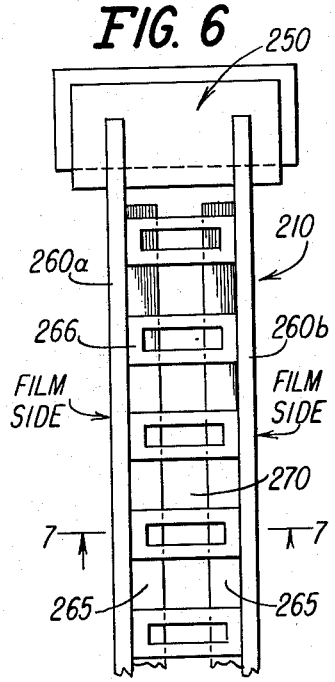
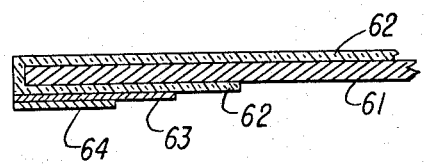
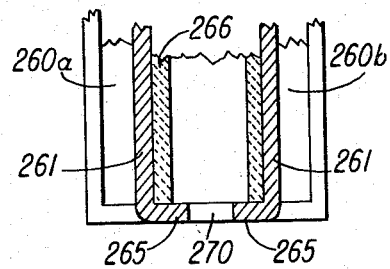
INVENTOR.
Douglas W. Quirk
BY
Attys.

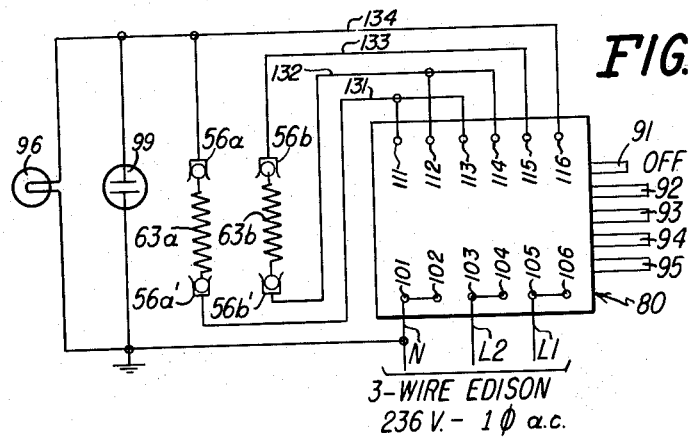
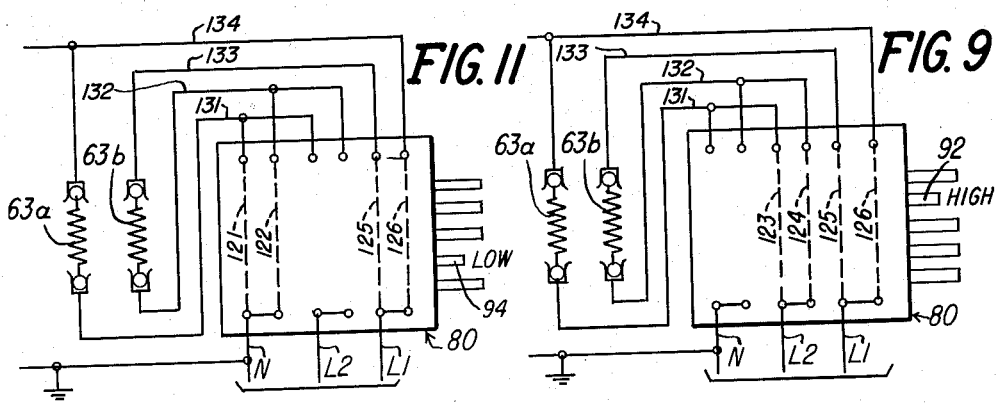
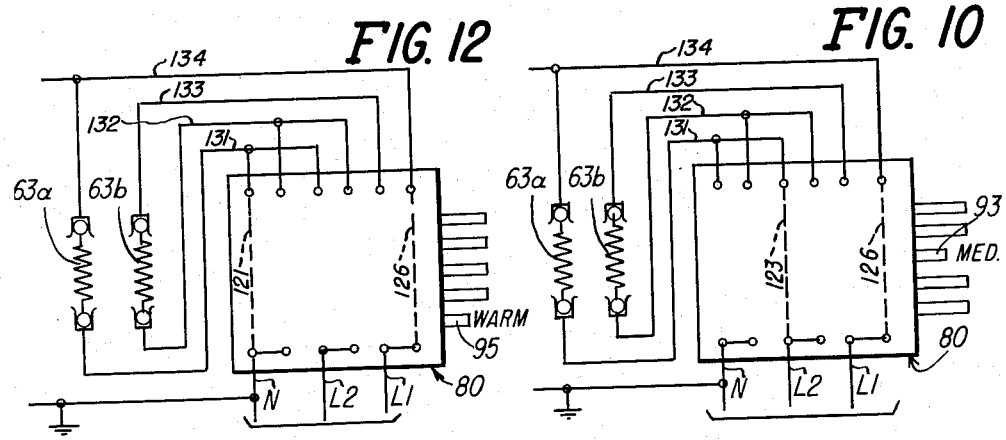
INVENTOR.
Douglas W. Quirk

_United States Patent Office_

3,026,398
Patented Mar. 20, 1962

3,026,398
BASEBOARD ELECTRIC HEATING SYSTEM AND ELECTRIC HEATING UNITS THEREFOR
Douglas W. Quirk, Deerfield, Ill., assignor to General Electric Company, a corporation of New York
Filed Apr. 22, 1959, Ser. No. 808,082
4 Claims. (Cl. 219—34)

The present invention relates to baseboard electric heating systems, and to electric heating units therefor, and more particularly to such systems and units that are especially designed for home use.

It is a general object of the invention to provide a baseboard heating system that may be installed in the room of an existing home in a ready and simple manner, without modification of the walls of the room.

Another object of the invention is to provide in a baseboard electric heating system, an improved and simplified control arrangement therefor that employs a manually operable multi-position selector switch for the purpose of selectively completing different electrical heating connections of corresponding different wattage ratings to a number of electric heating elements arranged in the baseboard structure, wherein the heating connections are selectively completed from an electric power source of the 3-wire Edison type.

A further object of the invention is to provide in electric heating apparatus, an electric heating unit of improved and simplified construction and arrangement and employing an electrically conductive film provided on an associated vitreous coating carried by a metal support.

A still further object of the invention is to provide in baseboard heating apparatus, an improved plug-and-socket arrangement of a number of electric heating units housed in the casing thereof, so as to accommodate assembly of the component elements of the apparatus in a simple and ready manner, while preserving great economy in the manufacture of the component elements mentioned.

Further features of the invention pertain to the particular arrangement of the elements of the electric heating system and of the electric heating unit, whereby the above-outlined and additional operating features thereof are attained.

The invention, both as to its organization and method of operation, together with further objects and advantages thereof, will best be understood by reference to the following specification, taken in connection with the accompanying drawings, in which:

FIGURE 1 is a fragmentary front view of baseboard electric heating apparatus embodying the present invention;

FIG. 2 is an enlarged lateral sectional view of the baseboard heating apparatus, taken in the direction of the arrows along the line 2—2 in FIG. 1;

FIG. 3 is a greatly enlarged fragmentary horizontal sectional view of the baseboard apparatus, taken in the direction of the arrows along the line 3—3 in FIG. 2, and illustrating the top of one of two wiring fixtures that are housed in the casing of the baseboard electric heating apparatus of FIG. 1, together with the adjacent fragmentary end portions of the two electric heating units that are connected to the wiring fixture shown.

FIG. 4 is a greatly enlarged fragmentary side elevational view, partly broken away, of one of the electric heating units, as shown in FIG. 3;

FIG. 5 is a greatly enlarged longitudinal sectional view, partly broken away, of the electric heating unit, taken in the direction of the arrows along the line 5—5 in FIG. 4;

FIG. 6 is an enlarged fragmentary plan view of a modified arrangement of the electric heating units that may be incorporated in the baseboard electric heating apparatus of FIG. 1, and including a number of refractory thermal storage elements;

FIG. 7 is a greatly enlarged fragmentary vertical sectional view of the arrangement of the heating units, taken in the direction of the arrows along the line 7—7 in FIG. 6; and FIGS. 8 to 12, inclusive, are diagrammatic illustrations of the fundamental elements of the electric heating system and respectively illustrating the incorporated selector switch in its respective off, high, medium, low and warm positions.

Referring now to FIGS. 1 and 2 of the drawings, there is illustrated a baseboard electric heating apparatus 10, embodying the features of the present invention, and adapted to be supported in a room adjacent to the junction of the floor 11 thereof and the lower portion of one of the upstanding room walls 12 thereof. As particularly shown in FIG. 2, the baseboard electric heating apparatus 10 is incorporated in an electric heating system, more fully described hereinafter; and the heating system may comprise one or a plurality of the baseboard electric heating apparatus 10, as required. In the arrangement, when the electric heating system comprises a plurality of the baseboard electric heating apparatus 10, the adjacent ends of the casings of the baseboard electric heating apparatus 10 are suitably joined together to form a unified baseboard in the room, since it is contemplated that each of the baseboard electric heating apparatus 10 have the same standard lateral cross-section, as illustrated in FIG. 2 and as described more fully below.

More particularly, the baseboard electric heating apparatus 10 essentially comprises an elongated casing including complementary rear and front sections 31 and 41 detachably secured together. The rear casing section 31 may be formed essentially of sheet material, either metal or molded plastic, and includes a substantially horizontally disposed bottom wall 32 that is adapted to engage the room floor 11, as shown in FIG. 2, and a substantially vertically disposed rear wall 33 that is adapted to be secured in place upon the lower portion of the upstanding room wall 12, as shown in FIG. 2. Also the rear casing section 31 includes an upwardly and rearwardly inclined wall 34 extending between the front portion of the bottom wall 32 and the lower portion of the rear wall 33 and cooperating therewith to define a wiring channel 35 in the lower or base portion of the rear casing section 31 that is adapted to receive electric cables, indicated at 36, that are employed in wiring the heating units incorporated in the apparatus 10 into a unified electric heating system. In the upwardly inclined wall 34, suitable knockouts 37 are provided in order to facilitate the required connections between the electric cables 36 and the electric heating units mentioned, as explained more fully hereinafter. Similarly, the front casing section 41 may be formed essentially of sheet material, either metal or molded plastic, and includes a substantially horizontally disposed top wall 42 and a generally vertically disposed front wall 43. The extreme rear portion of the top wall 42 is provided with a downwardly turned portion 42a that is adapted to be received by a forwardly and upwardly directed ledge 33a carried on the extreme top of the rear wall 33. The front wall 43 includes a substantially vertical lower portion 43a and a rearwardly and upwardly inclined upper portion 43b joining the front of the top wall 42. The extreme lower end of the lower portion 43a of the front wall 43 is provided with a forwardly and downwardly directed ledge 44 disposed above the upwardly inclined wall 34 and cooperating therewith to define an elongated air inlet passage 45 into the casing of the apparatus 10;

and the upper portion 43b of the front wall 43 has a number of longitudinally spaced-apart holes or windows 46 formed therein to define air outlet passages from the casing of the apparatus 10.

As best shown in FIGS. 2 and 3, a pair of longitudinally spaced-apart wiring fixtures 50 are suitably carried by the rear wall 33 of the rear casing section 31 and disposed above the upwardly inclined wall 34 thereof; which wiring fixtures 50 detachably receive and support a pair of elongated electric heating units 60a and 60b extending longitudinally therebetween and arranged in rear and front positions and housed in the casing of the apparatus 10. The wiring fixtures 50 may be identical; and each of the fixtures 50 comprises an open box-like supporting bracket 51 that is provided with an end wall 52, a bottom wall 53, a rear wall 54 and a front wall 55; whereby each of the brackets 51 is open both at the top and at one end thereof. As illustrated in FIG. 3, the rear wall 54 of the bracket 51 is secured to the adjacent portion of the rear wall 33 of the rear casing section 31. Secured in place within the bracket 51 is a socket element 56 that may be formed fundamentally of porcelain, or other insulating material; which socket element 56 is provided with a pair of upstanding slots 56a and 56b therein that are respectively disposed in rear and front positions therein and that are adapted respectively to receive the adjacent ends of the electric heating units 60a and 60b. Also, the socket element 56 carries a pair of resilient structures, not shown, that respectively cooperate with the adjacent ends of the electric heating units 60, so as detachably to secure the same in place by frictional engagement; which resilient structures respectively include rear and front contact springs respectively indicated at 57a and 57b; which contact springs 57a and 57b respectively engage contact structure respectively carried by the rear and front electric heating units 60a and 60b when they occupy their normal positions respectively disposed in the rear and front slots 56a and 56b provided in the socket element 56. The complete structure of the wiring fixture 50 has not been disclosed in detail, in the interest of brevity, since this piece of equipment is entirely conventional and forms no part of the present invention.

Referring now to FIGS. 4 and 5, each of the electric heating units 60 essentially comprises an elongated supporting strip 61 that is preferably formed of steel and that is provided with a suitable insulating coating 62 formed of glass, enamel, or the like. One surface or side of the glass enamel coating 62 carries an electric heating element or resistor film 63 that preferably comprises tin chloride; which resistor film 63 extends longitudinally along the glass enamel coating 62 between the ends of the heating unit 60. The opposite ends of the resistor film 63 carry contact strips 64 that are preferably formed of silver; which contact strips cooperate with the contact springs 57a or 57b provided in the socket elements 56 of the wiring fixtures 50, for the electrical contact purpose.

In manufacturing the heating unit 60, the steel supporting strip 61 is first thoroughly cleaned with an alkaline cleaner to remove oil, grease and other contaminants therefrom, is then pickled by subjection to sulfuric acid spray, and is then thoroughly rinsed in water. Normally, the pickled steel supporting strip 61 is then immersed in a nickel sulfate bath, is again rinsed, is then subjected to an alkaline neutralizer, and is then dried. The steel supporting strip 61 is then dipped into a ground coat of glass enamel and dried at about 350° F. The ground coat is reinforced at any required point, ordinarily by manual spraying; and is then fired at a temperature of 1550° F. to fuse the glass enamel. The final thickness of the vitreous enamel coating 62 is of the order of 0.004".

A previously prepared solution of tin chloride is then suitably applied to one face of the glass enamel coating 62 to produce the resistor film 63; and silver foil may be applied along the end margins of the film 63 to produce the silver contact strips 64. Following this, the assembly is fired at a temperature of about 1100° F. to reduce the coating of tin chloride to its ultimate condition in which it comprises the hard electrically conductive film 63; which film 63 has high scratch resistance and sufficient flexibility to expand and to contract with the supporting strip 61 and the intervening glass enamel coating 62, without rupture or separation from the vitreous enamel coating 62. The firing of the film 63 may be carried out for about twenty minutes, and thereafter the same may be cooled in air. At 1100° F., the vitreous enamel ground coating 62 becomes plastic, but nevertheless accepts the tin chloride in a film bonded thereto, without penetration thereof. During the final firing of the tin chloride coating, the silver strips 64 are also bonded thereto, whereby the resulting silver contact strips 64 are bonded to the opposite ends of the tin chloride resistor film 63 to provide good electrical connection therewith.

The complete electric heating unit 60 comprises the tin chloride resistor film 63 extending continuously between the silver contact strips 64 disposed at the opposite ends of the electric heating unit 60 and electrically connected thereto; and the tin chloride resistor film 63 is electrically insulated from the steel supporting strip 61 by the intervening glass enamel coating 62. In the electric heating unit 60, temperatures as high as 700° F. may be readily obtained without damage in use to the resistor film 63 and a continuous rating of 550° F. is recommended; the final coating of the film 63 is homogeneous and has a thickness ordinarily of about $16 \times 10^{-6}$ of an inch, and a wattage density of about 2.5 watts per square inch.

A satisfactory solution of tin chloride for use in the production of the tin chloride resistor film 63, as described above, may be prepared by dissolving one part of anhydrous stannic chloride in one part absolute alcohol by volume, and then adding one part water by volume. This mixture or solution is then suitably applied onto the glass enamel coating 62 and subsequently fired to produce the tin chloride resistor film 63, as described above. Other examples of suitable tin chloride solutions of the present character are omitted in the interest of brevity, since they are otherwise well-known in the production of electrically conductive films upon glass and other vitreous objects in the glass-working art.

Again referring to FIGS. 2 and 3, it is preferable that the two electric heating units 60a and 60b be supported at the opposite ends thereof in the two socket elements 56 carried by the two longitudinally spaced-apart wiring fixtures 50 in such position that the "film sides" thereof are respectively disposed toward the rear wall 33 of the rear casing section 31 and toward the front wall 43 of the front casing section 41, and so that the two electric heating units 60a and 60b are disposed in spaced-apart relation to provide an upstanding channel 70 therebetween for the passage of air therethrough, as best illustrated in FIG. 2. This arrangement of the two electric heating units 60a and 60b with the resistor films on the outsides of the channel 70 is very advantageous due to a peculiar phenomenon that is encountered in the operation of a heating unit of the present type, including an electrically conductive resistor film, and pertaining to the circumstance that the film also constitutes a heat-reflector, so as to effect preferential radiation of heat from the interior surfaces thereof with respect to the exterior surfaces thereof, whereby the major fraction of the heat generated therein is directed toward the adjacent supporting strips and thus toward the upstanding channel 70. More particularly, with reference to FIG. 5, it will be appreciated that the resistor film 63 of the heating unit 60 serves as a reflector for the thermal heat causing the preferential radiation of the heat generated therein toward the supporting strip 61.

Accordingly, it will be understood that when the "film sides" of the two electric heating units 60a and 60b are disposed on the outsides of the upstanding channel 70, the thermal heat generated in the two films 63 is preferentially directed toward the supporting strips 61 and thus toward the channel 70, thereby effecting both efficient heating of the air passing upwardly through the channel 70 and shielding of the rear wall 33 and the front wall 43 from some of the heat generated by the films 63 of the electric heating units 60a and 60b.

In the operation of the electric heating apparatus 10, one or both of the electric heating units 60 are energized at one of the several wattage ratings; whereby the air in the channel 70 is heated and rises therethrough so as to produce circulation of the room air through the casing thereof. More particularly, the room air is circulated into the air inlet passage 45 and upwardly through the channel 70 and thence out of the holes or windows 46 and back into the room; whereby the air thus circulated through the casing of the apparatus 10 is heated for the room-heating purpose, the air being circulated through the casing of the apparatus 10 fundamentally by convection currents produced by the bottom location of the opening 45 and the top location of the holes 46, together with the central location of the electric heating units 60a and 60b.

Again referring to FIGS. 1 and 2, the casing of the apparatus 10 houses a manually-operable multi-position selector switch 80; which selector switch 80 is preferably of the construction of that disclosed in U.S. Patent No. 2,437,555, that was granted on March 9, 1948 to Gregory L. Rees. More particularly, the selector switch 80 comprises a base 80 that is directly secured to a bracket 82 that is carried by the rear wall 33 of the rear casing section 31 adjacent to the right-hand end of the apparatus 10. Also, the selector switch 80 includes five individual pushbuttons 91, 92, 93, 94 and 95, projecting through corresponding holes provided in the top wall 42 of the front casing section 41. In the arrangement: the pushbutton 91 comprises an "off" pushbutton; the pushbutton 92 comprises a "high" pushbutton; the pushbutton 93 comprises a "medium" pushbutton; the pushbutton 94 comprises a "low" pushbutton; and the pushbutton 95 comprises a "warm" pushbutton. Of course, the selector switch 80 comprises switching mechanism that is selectively operated by the pushbuttons 91 to 95, inclusive, into corresponding switching positions, as explained more fully hereinafter, as well as interlock mechanism that accommodates operation of only one of the pushbuttons at any given time, the interlock mechanism also responding to the operation or depression of any one of the pushbuttons to effect the return into its restored or projected position of the last previously operated one of the pushbuttons. Further, the selector switch 80 comprises selectively operative signal and illuminating mechanism that includes an associated electric lamp 96 and a cooperating lamp hood 97, all as disclosed in the Rees patent. More particularly, when the "off" pushbutton 91 is operated, the electric lamp 96 is extinguished, and when any one of the pushbuttons 92, 93, 94 and 95 is operated, the electric lamp 96 is illuminated; and moreover, the color signal mechanism is selectively actuated, so that the operated one of the pushbuttons 92, 93, 94 or 95 is illuminated with a corresponding and distinct color, thereby presenting a color signal correlated with the operated position of the corresponding pushbutton 92, 93, 94 or 95. Furthermore, a socket 98 is also carried by the bracket 82; which socket 98 carries a signal lamp 99 that projects through a corresponding opening provided in the top wall 42 of the front casing section 41. Preferably, the signal lamp 99 is of the glow-discharge type and may comprise a neon lamp; whereby the same glows with a distinct red color when any one of the pushbuttons 92, 93, 94 or 95 occupies its operated position, as explained more fully hereinafter.

Referring now to FIG. 8, the electric heating system further comprises a source of electric power supply of the 3-wire Edison type of 236-volts, single-phase, A.C., including a grounded neutral conductor N and two ungrounded line conductors L1 and L2. As illustrated, the electric heating element or "film" of the electric heating unit 60a is indicated at 63a and the electric heating or "film" of the electric heating unit 60b is indicated at 63b; the wiring fixture 50 disposed at one end of the casing of the apparatus 10 is provided with the electrical contact springs indicated at 56a and 56b, and the wiring fixture 50 disposed at the other end of the casing of the apparatus 10 is provided with the electrical contact springs indicated at 56a' and 56b'. More specifically, the contact terminals of the heating element 63a disposed at the opposite ends thereof are respectively arranged in electrical contact with the contact springs 56a and 56a' and the contact terminals of the heating element 63b disposed at the opposite ends thereof are respectively arranged in electrical contact with the contact springs 56b and 56b'.

The selector switch 80 comprises six incoming terminals 101 to 106, inclusive, and six outgoing terminals 111 to 116, inclusive, as well as switching mechanism including six switch blades 121 to 126, inclusive. In the arrangement, the incoming terminals 101 and 102 are commonly connected to the neutral conductor N, the incoming terminals 103 and 104 are commonly connected to the line conductor L2 and the incoming terminals 105 and 106 are commonly connected to the line conductor L1. The outgoing terminals 111 and 113 are commonly connected to a conductor 131 that extends to the contact springs 56a'; the outgoing terminals 112 and 114 are commonly connected to a conductor 132 that extends to the contact springs 56b'; the outgoing terminal 115 is connected to a conductor 133 that extends to the contact spring 56b; and the outgoing terminal 116 is connected to a conductor 134 that extends to the contact spring 56a. The electric lamp 96 and the signal lamp 99 are connected in parallel relation between the conductor 134 and the neutral conductor N.

When the "off" pushbutton 91 of the selector switch 80 occupies its operated position, as shown in FIG. 8, the six incoming terminals 101 to 106, inclusive, are respectively disconnected from the six outgoing terminals 111 to 116, inclusive; whereby both the electric lamp 96 and the signal lamp 99 are extinguished.

When the "high" pushbutton 92 of the selector switch 80 occupies its operated position, as shown in FIG. 9, the four incoming terminals 103, 104, 105 and 106 are respectively connected by the switch blades 123, 124, 125 and 126 to the four outgoing terminals 113, 114, 115 and 116; whereby the heating elements 63a and 63b are energized in parallel relationship across the line conductors L1 and L2. This circuit connection constitutes a high wattage connection and may provide a combined wattage of 1000 watts, for example. Also, the electric lamp 96 and the signal lamp 99 are energized between the neutral conductor N and the conductor 134 that is connected via the switch blade 126 to the line conductor L1; whereby the electric lamp 96 illuminates the operated "high" pushbutton 92 with its corresponding distinct color, while the signal lamp 99 glows with the characteristic red color thereof.

In view of the foregoing, it will be understood that when the "medium" pushbutton of the selector switch 80 is operated, as illustrated in FIG. 10, only the heating element 63a is energized across the line conductors L1 and L2, thereby producing a wattage rating of 500 watts, in accordance with the foregoing example. Similarly, when the "low" pushbutton 94 of the selector switch 80 is operated, as illustrated in FIG. 11, both of the heating elements 63a and 63b are energized in parallel relationship between the neutral conductor N and the line conductor L1, thereby producing a wattage rating of 250 watts, in accordance with the foregoing example. Finally, when the "warm" pushbutton 95 of the selector switch 80 is operated as illustrated in FIG. 12, only the heating element 63a is energized across the neutral conductor N and the line conductor L1, thereby producing a wattage rating of 125 watts, in accordance with the foregoing example.

In view of the foregoing discription of the mode of operation of the electric heating system, as described in conjunction with FIGS. 8 to 12, inclusive, it will be understood that the effective wattage that is produced by the apparatus 10 may be readily preset by selective operation of the manually operable pushbutton switch 80, thereby to establish the required heating rating with respect to the room air that is circulated through the casing of the apparatus 10. Of course, the higher the wattage rating of the apparatus 10 that is employed, the higher the temperature of the room air will be maintained. At any time, when the person in the room feels that the room air temperature is either too high or too low, he may selectively operate the pushbutton switch 80 in order to effect a change in the used wattage rating of the apparatus 10, thereby to make a change in the required direction with respect to the temperature of the room air. While the heating system employs no automatic temperature control arrangement, this possible inconvenience is greatly offset by the substantial economy in manufacturing cost of the heating system. Moreover, in individual room heating systems of this character, the inclusion of an automatic temperature control arrangement therein is not ordinarily nearly so effective for the purpose of maintaining a desired temperature in the room as might be expected by virtue of the fact that the ideal temperature of the room air is dependent upon many factors over which the person occupying the room has no control, and including the relative humidity in the room, the rate of dissipation of heat from the room (both to other parts of the house and to the outside), etc. Accordingly, the present electric heating system is very advantageous and entirely satisfactory, notwithstanding the total absence therefrom of an automatic temperature controller or regulator.

Referring now to FIGS. 6 and 7, the modified form of the electric heating apparatus 210 there illustrated and embodying the features of the present invention, is essentially the same as the apparatus 10 previously described, except that the heating units 260a and 260b are of modified construction. In this arrangement, the opposite ends of the heating units 260a and 260b are supported in the longitudinal spaced-apart wiring fixtures 250, in the manner previously explained; and the intermediate portions of the steel supporting strips 261 of the heating units 260a and 260b are provided with inwardly directed and facing flanges 265; and arranged in the channel 270 between the heating units 260a and 260b are a number of longitudinally spaced-apart refractory bodies 266 that may essentially comprise hollow tiles. More particularly, the hollow tiles 266 are arranged in upstanding position and in longitudinally spaced-apart relation and removably supported in the channel 270 by the inwardly directed flanges 265. In the arrangement, the "film" sides of the heating units 260a and 260b are disposed on the outsides of the channel 270 so as to effect the preferential transmission of heat generated in the films of the heating units 260a and 260b toward the tiles 266. Accordingly, the tiles 266 provide desirable thermal mass in the apparatus 210 and store heat for retransmission to the upwardly moving air current in the channel 270. More particularly, the upwardly moving air current in the channel 270 passes through the hollow tiles 266 and also between the hollow tiles 266, since they are arranged in longitudinally spaced-apart relation. The tiles 266 may be formed of porcelain, clay, or other suitable refractory material. Of course, it will be understood that the tiles 266 may be removed from their supported positions upon the heating units 260a and 260b and that the heating units 260a and 260b may be placed and removed with respect to the associated wiring fixtures 250, all in the manner previously explained. The remainder of the construction of the apparatus 210 is the same as that of the apparatus 10 previously described and further description thereof is omitted in the interest of brevity.

In view of the foregoing, it is apparent that there has been provided an improved electric baseboard system and heating apparatus therefor involving electric heating units of improved and simplified construction and arrangement, which heating apparatus and system may be readily installed in the room of an existing house or in a room incident to the construction of the house in a simple and economical manner.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. Electric heating apparatus comprising an elongated hollow casing provided with passages therein accommodating the circulation of air therethrough, an elongated heating unit removably supported in said casing and adapted to heat the air circulated therethrough, said heating unit including a pair of elongated metal supporting strips mounted in adjacent spaced-apart facing relation to define an air passage therebetween and a pair of vitreous enamel coatings respectively carried on the outside surfaces of said supporting strips and two pairs of electric terminals respectively carried on said coatings at the opposite ends of said supporting strips and a pair of elongated electrically-conductive films respectively carried on said coatings and respectively extending between said terminals and respectively electrically connected thereto, whereby each of said films constitutes an electric heating element, a pair of longitudinally spaced-apart wiring fixtures mounted in said casing and adapted removably to support said heating unit in said casing with said supporting strips in upstanding positions so that the outside surface of one of said supporting strips is spaced forwardly of and in facing relation with respect to the rear of said casing and so that the outside surface of the other of said supporting strips is spaced rearwardly of and in facing relation with respect to the front of said casing, each of said films also constituting a thermal heat reflector effecting preferential radiation of heat from the interior surface thereof with respect to the exterior surface thereof so that the larger fraction of the heat generated therein is directed toward the adjacent one of said supporting strips and thus toward said air passage, the air circulated through said casing passing through said air passage when said heating unit is supported in said casing, said wiring fixtures also respectively detachably receiving said two pairs of terminals when said heating unit is supported in said casing, and a manually operable multi-position selector switch carried by said casing and electrically connected to said wiring fixtures and arranged selectively to control selective energizations of said electric heating elements.

2. An electric heating unit comprising a pair of elongated metal supporting strips mounted in adjacent spaced-apart facing relation to define an air passage therebetween, a pair of vitreous enamel coatings respectively carried on the outside surfaces of said supporting strips, a pair of elongated electrically conductive films respectively carried on said coatings, each of said films constituting an electric heating element and also constituting a thermal heat reflector effecting preferential radiation of heat from the interior surface thereof with respect to the exterior surface thereof so that the larger fraction of the heat generated therein is directed toward the adjacent supporting strip and thus toward said air passage, electric terminals for selectively energizing said electric heating elements so as to effect selective heating of the air in said air passage, and a plurality of refractory bodies supported between said supporting strips in good heat-exchange relation therewith and arranged in said air passage in the path of the flow of the air therethrough.

3. The electric heating apparatus set forth in claim 1, wherein each of said films consists essentially of a salt of tin.

4. The electric heating apparatus set forth in claim 1, wherein each of said films has a continuous rating of at least 2½ watts per square inch of surface thereof and is capable of continuous operation at a temperature of at least 550° F.

References Cited in the file of this patent

UNITED STATES PATENTS

| | | |
|---|---|---|
| 760,076 | Leonard | May 17, 1904 |
| 1,398,521 | Hynes | Nov. 29, 1921 |
| 1,422,130 | Reynolds | July 11, 1922 |
| 2,119,680 | Long | June 7, 1938 |
| 2,431,904 | Andrews | Dec. 2, 1947 |
| 2,437,555 | Rees | Mar. 9, 1948 |
| 2,495,788 | Trist | Jan. 31, 1950 |
| 2,564,677 | Davis | Aug. 21, 1951 |
| 2,564,987 | Mochel | Aug. 21, 1951 |
| 2,678,990 | Quirk | May 18, 1954 |
| 2,795,682 | Knoll | June 11, 1957 |
| 2,939,807 | Needham | June 7, 1960 |

FOREIGN PATENTS

| | | |
|---|---|---|
| 39,314 | France | July 28, 1931 |
| 553,301 | Canada | Feb. 18, 1958 |